United States Patent [19]
Schmid

[11] Patent Number: 6,039,664
[45] Date of Patent: Mar. 21, 2000

[54] TENSIONING DEVICE FOR TRACTION SYSTEMS SUCH AS BELTS AND CHAINS

[75] Inventor: Michael Schmid, Hochstadt, Germany

[73] Assignee: Ina Walzlarger Schaefler KG, Germany

[21] Appl. No.: 08/973,978

[22] PCT Filed: Mar. 12, 1996

[86] PCT No.: PCT/EP96/01050

§ 371 Date: Dec. 15, 1997

§ 102(e) Date: Dec. 15, 1997

[87] PCT Pub. No.: WO97/01717

PCT Pub. Date: Jan. 16, 1997

[30] Foreign Application Priority Data

Jun. 29, 1995 [DE] Germany .................. 195 23 647

[51] Int. Cl.[7] .................................................. F16H 7/12
[52] U.S. Cl. .................... 474/135; 474/133; 474/138; 474/117; 474/101
[58] Field of Search ................................ 474/110, 112, 474/101, 135, 209, 136; 384/152, 151; 188/379

[56] References Cited

U.S. PATENT DOCUMENTS

| | | |
|---|---|---|
| 4,144,772 | 3/1979 | Brackin et al. . |
| 4,401,198 | 8/1983 | Kunczynski .............................. 188/379 |
| 4,601,683 | 7/1986 | Foster .................................. 474/110 X |
| 4,721,495 | 1/1988 | Kan et al. ............................... 474/135 |
| 4,795,408 | 1/1989 | Kotegawa et al. ....................... 474/209 |
| 4,832,665 | 5/1989 | Kadota et al. . |
| 4,923,435 | 5/1990 | Kadota et al. ........................... 474/112 |
| 4,925,437 | 5/1990 | Suzuki et al. . |
| 4,934,987 | 6/1990 | Kadota et al. ........................... 474/112 |
| 5,288,276 | 2/1994 | Golovatgai-Schmidt et al. . 474/135 X |
| 5,458,542 | 10/1995 | Sakai et al. ............................. 474/135 |

FOREIGN PATENT DOCUMENTS

| | | |
|---|---|---|
| 0337215 | 10/1989 | European Pat. Off. . |
| 3809169 | 10/1988 | Germany . |
| 4124636 | 1/1993 | Germany . |
| 4336467 | 5/1994 | Germany . |
| 4336467 | 6/1994 | Germany . |
| 528175 | 10/1940 | United Kingdom .................. 384/151 |
| 2200429 | 8/1988 | United Kingdom . |

*Primary Examiner*—David A. Bucci
*Assistant Examiner*—Marcus Charles
*Attorney, Agent, or Firm*—Bierman, Muserlian and Lucas

[57] ABSTRACT

A tensioner for traction elements such as belts and chains comprises a tension lever (2) on which is arranged a tension roller (3) for the traction element. A mounting lug (5) of the tension lever (2) is pivoted by a radial bearing (13) on an axle (6) provided on an engine block (4), while axial stops (8) are arranged on both ends of the mounting lug (5). The tensioner further comprises a tension spring element (1) which acts at one end on the tension lever (2) and at a second end on the engine block. To prevent rattling noises which result from axial displacements of the tension lever (2), the invention provides the arrangement of sealing rings (12) on the two axial ends of the mounting lug (5), which sealing rings (12) seal the radial bearing (13) at its front ends while projecting axially beyond the end surfaces of the mounting lug (5), the axial distance between the axial stops (8) being larger than the axial distance between the end surfaces of the sealing rings (12).

5 Claims, 2 Drawing Sheets

TENSIONING DEVICE FOR TRACTION SYSTEMS SUCH AS BELTS AND CHAINS

DESCRIPTION

Tensioning Device for Traction Systems such as Belts and Chains

The invention concerns a tensioner for traction elements such as belts and chains, particularly for belt drives of automotive vehicles, comprising a tensioning element, particularly a tension roller, for a tension lever associated to the traction element, a mounting lug of said tension lever being pivoted by a radial bearing on an axle provided on an engine block, and axial stops for the mounting lug being arranged on both ends of the mounting lug, the tensioner further comprising a tension spring element acting at one end on the tension lever and at a second end on the engine block.

A tensioner of the above type is known, for example, from DE-C 38 09 169. In this tensioner, a machine screw inserted through the mounting lug engages into a threaded bore on the engine block, the axial stops being formed by the engine block and the screw head. It is required, in all cases of use, that the tension lever have a certain axial play in the region of the mounting lug. However, accelerations and decelerations of the engine can cause oscillatory movements of the tension lever which result in annoying rattling noises because the mounting lug strikes against the engine block and the screw head.

It is an object of the invention to eliminate these rattling noises using simple means.

The invention achieves the above object by providing sealing rings on both axial ends of the mounting lug, which sealing rings seal the radial bearing at its front ends and project axially beyond the end surfaces of the mounting lug, the axial distance between the axial stops being larger than the axial distance between the end faces of the mounting lug facing the stops.

In a tensioner with the above configuration, one of the sealing rings strikes against its associated axial stop during axial displacements of the tension lever whereby rattling noises are prevented because the sealing rings are made of a soft material which can be a material with rubber-like elastic properties. In addition, the sealing rings provide a reliable sealing of the radial bearing.

The axle can be constituted, for example, by a bush comprising a radial shoulder at each end, with a disc which overlaps the mounting lug in radial direction being arranged on each shoulder. In this case, the axial stops are formed by the discs which can be clamped on one side between the bush and the engine block and on the other side, between the bush and a clamping head. This eliminates the need of additionally fixing the discs on the bush. The clamping head can be constituted, for example, by a screw head of a machine screw which engages into a threaded bore of the engine block. The sealing rings can be lodged on the mounting lug, for example, in annular grooves provided on each axial end of the mounting lug, the axial depth of the annular grooves being smaller than the axial dimension of the sealing rings. This assures that the end surfaces of the mounting lug do not come into contact with the discs as a result of axial displacements of the tension lever.

The invention can be used particularly advantageously in tensioners having linear action springs.

One example of embodiment of the invention is described below and illustrated in three figures.

Figure 1:
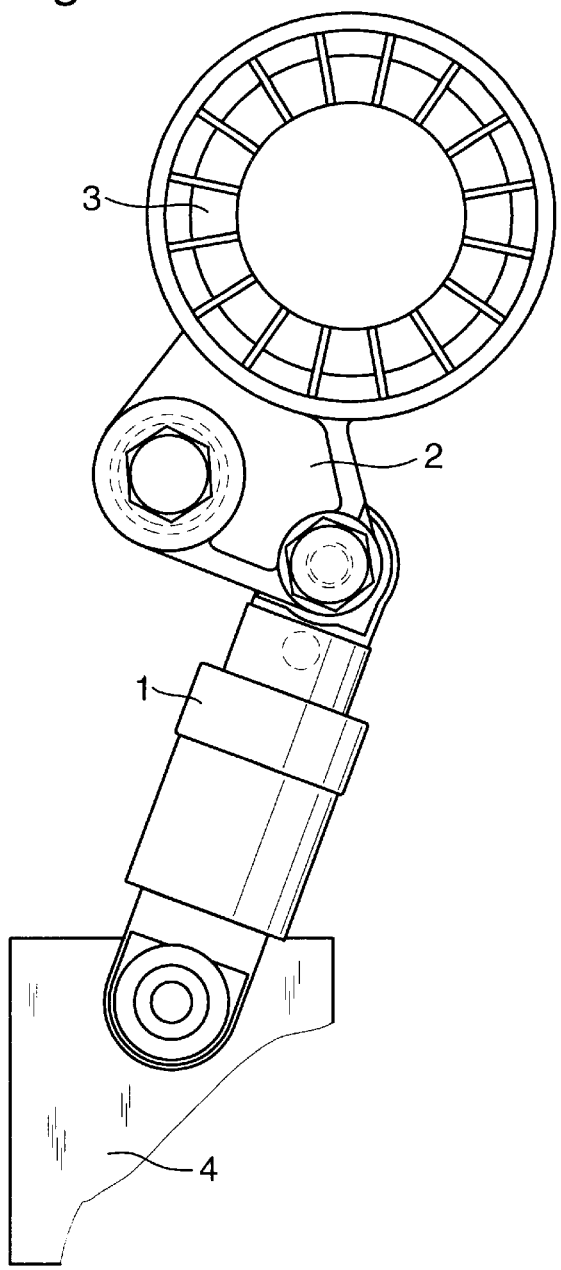
FIG. 1 is a general view of a tensioner of the invention.
Figure 2:
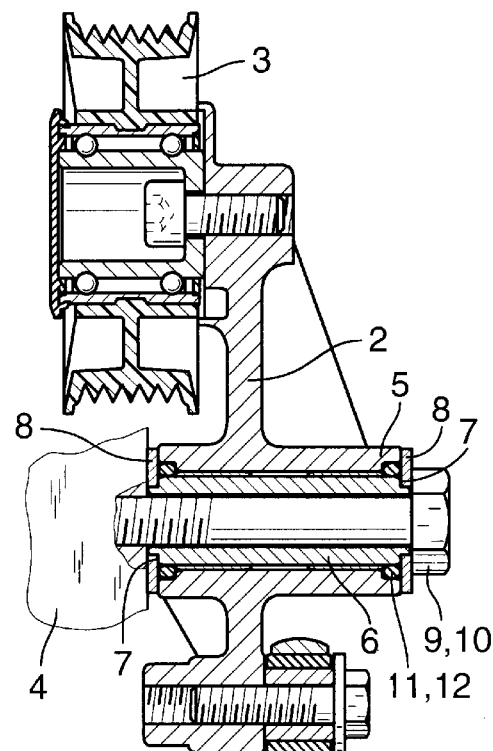
FIG. 2 shows a cross-section through the tensioner of the invention of FIG. 1.
Figure 2:
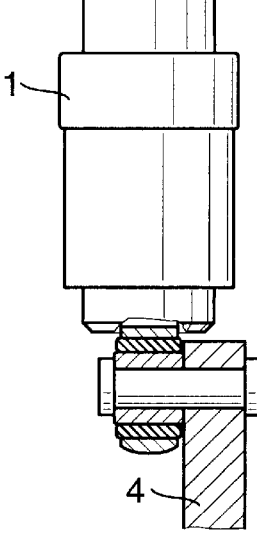

As can be seen in FIG. 1, the tensioner of the invention comprises a linear action tension spring element 1, a tension lever 2 and a tension roller 3. The tension spring element 1 is pivoted at one end on the engine block 4 and fixed releasably on the tension lever 2 at the other end. The tension roller 3 is rotatably fixed on the tension spring element 1. As can best be seen in FIG. 2, the tension lever 2 is likewise releasably fixed on the engine block 4. A mounting lug 5 of the tension lever 2 is rotatably mounted on a bush-like axle 6. On each front end of the axle 6 there is formed a radial shoulder 7 on which a disc 8 is arranged. Each of the discs 8 overlaps the mounting lug 5 in radial direction. One of the discs 8 is clamped between one of the radial shoulders 7 and the engine block 4 while the second disc 8 is clamped between the second radial shoulder 7 and a screw head 9 of a machine screw 10 fixed on the engine block 4. The mounting lug 5 comprises an annular groove 11 on each of its ends into which a sealing ring 12 is inserted.

Figure 3:
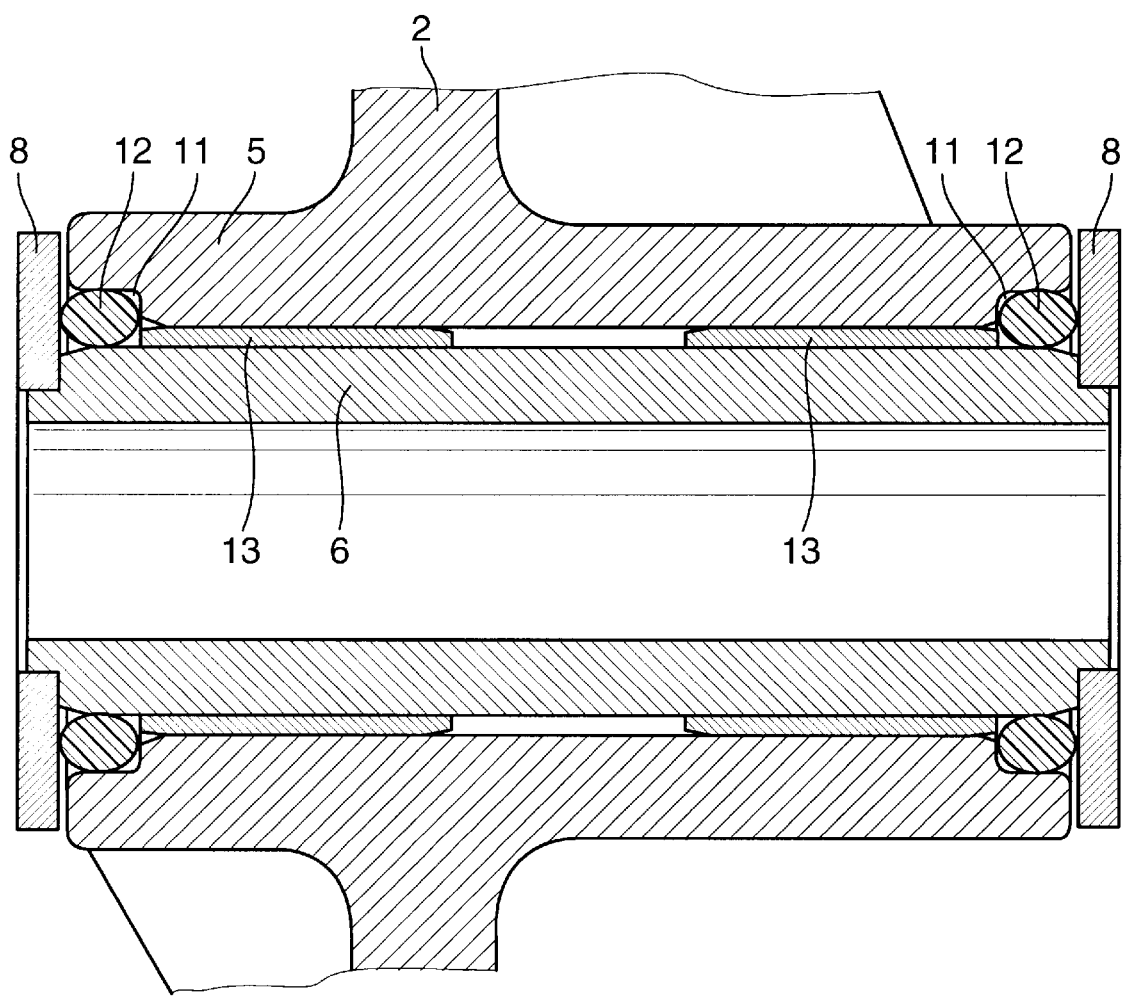
FIG. 3 is an enlarged view of the mounting lug of FIG. 2.

From FIG. 3 it can be seen that the axial depth of the annular grooves 11 is smaller than the axial dimension of the sealing rings 12 and that the sealing rings 12 project axially beyond the mounting lug 5. The distance between the end faces of the mounting lug 5 facing the discs 8 is smaller than the axial distance between the ends of the discs 8.

The method of functioning of the tensioner of the invention will now be described in greater detail. By reason of the configuration described above, axial movements of the mounting lug 5 on the axle 6 are possible. On displacement of the mounting lug 5 in either axial direction, the respective sealing ring 12 which bears against its associated disc 8 is elastically deformed so that, by reason of the soft material of the sealing ring, rattling noises due to axial displacements of the mounting lug 5 are reliably prevented. A radial bearing 13 arranged between the axle 6 and the mounting lug 5 is sealed at its front ends from the environment by the sealing rings 12. Each sealing ring 12 bears sealingly with its peripheral surface against the peripheral surface of the annular groove and the peripheral surface of the axle 6.

What is claimed is:

1. A tensioner for a traction element for belt drives of automotive vehicles, comprising a tension roller (3), for a tension lever (2) associated to the traction element, a mounting lug (5) of said tension lever (2) being pivoted by a radial bearing (13) on an axle (6) provided on an engine block (4), and axial stops for the mounting lug (5) being arranged on both ends of the mounting lug (5), the tensioner further comprising a tension spring element (1) acting at one end on the tension lever (2) and at a second end on the engine block (4), characterized in that sealing rings (12) are provided on both axial ends of the mounting lug (5), which sealing rings (12) seal the radial bearing (13) at front ends thereof and project axially beyond end surfaces of the mounting lug (5), an axial distance between the axial stops being larger than an axial distance between the end surfaces of the mounting lug (5) facing the axial stops.

2. A tensioner of claim 1 wherein each axial stop is a disc, the axle is constituted by a bush (6) comprising a radial shoulder (7) at each end, with the disc which overlaps the mounting lug (5) in radial direction being arranged on each radial shoulder (7).

3. A tensioner of claim 2 wherein the discs (8) are clamped on one side between the bush (6) and the engine block (4) and on a second side, between the bush (6) and a clamping head (9).

4. A tensioner of claim 1 wherein the tension spring element (1) is a linear action spring element.

5. A tensioner for a traction element for belt drives of automotive vehicles, comprising a tension roller (3), for a tension lever (2) associated with the traction roller (3), a mounting lug (5) of said tension lever (2) being pivoted by a radial bearing (13) on an axle (6) provided on an engine block (4), and axial stops for the mounting lug (5) being arranged on both ends of the mounting lug (5), the tensioner further comprising a tension spring element (1) acting on one end on the tension lever (2) and at a second end on the engine block (4), characterized in that sealing rings (12) are provided on both axial ends of the mounting lug (5) provided with an annular groove (11) on each axial end, in which annular groove (11) a sealing ring (12) is arranged, an axial depth of the annular groove (11) being smaller than an axial dimension of the sealing ring (12), which sealing rings (12) seal the radial bearing (13) at front ends thereof and project axially beyond end surfaces of the mounting lug (5), an axial distance between the axial stops being larger than an axial distance between the end surfaces of the mounting lug (5) facing the axial stops.

* * * * *